United States Patent Office 3,299,127
Patented Jan. 17, 1967

3,299,127
HYDROGENATION OF ALDEHYDE DIOXOLONE
DERIVATIVES OF LACTIC ACID
Mitchell Frank Zienty, Elkhart County, Ind., assignor to Miles Laboratories, Inc., Elkhart, Ind., a corporation of Indiana
No Drawing. Filed Jan. 2, 1964, Ser. No. 335,361
14 Claims. (Cl. 260—535)

This invention relates to a process for the preparation of ether derivatives of propionic acid. More particularly, it relates to a process of reacting hydrogen with an aldehyde dioxolone derivative of lactic acid to form the desired ether derivative of propionic acid.

In accordance with the present invention, ether derivatives of propionic acid selected from the class consisting of compounds of the formulae:

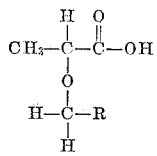

and

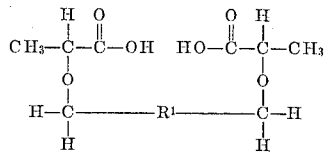

wherein R is selected from the class consisting of the hydrogen atom and monovalent hydrocarbon radicals selected from the class consisting of alkyl, aryl, alkaryl, aralkyl, alicyclic and heterocyclic radicals and substituted radicals thereof wherein the substituents are selected from the class consisting of halogen, amino, cyano, nitro, hydroxy and alkoxy radicals and $R^1$ is a divalent hydrocarbon radical selected from the class consisting of alkylene, arylene, cycloalkylene and heterocyclic radicals, are prepared by reacting hydrogen, in the presence of a hydrogenation catalyst, with an aldehyde dioxolone derivative of lactic acid selected from the class consisting of compounds of the formulae:

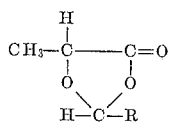

and

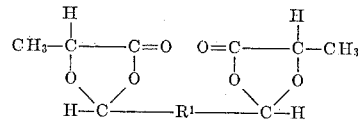

wherein R and $R^1$ are defined above.

The monovalent hydrocarbon radicals which are represented by R in the above formula are illustrated by alkyl groups, such as methyl, ethyl, propyl, isopropyl, butyl, isobutyl, amyl, hexyl and the like; aryl groups such as phenyl, naphthyl and the like; alkaryl groups, such as tolyl, ethylphenyl, xylyl, mesityl and the like; aralkyl groups, such as benzyl, phenylethyl and the like; alicyclic groups, such as cyclopentyl, cyclohexyl and the like; heterocyclic groups, such as furfuryl, thienyl, pyridyl and the like; and substituted groups, such as chloroethyl, aminophenyl, cyanotolyl, nitrobenzyl, hydroxycyclopentyl, methoxyfurfuryl and the like.

The divalent hydrocarbon radicals which are represented by $R^1$ in the above formulae are illustrated by alkylene groups, such as —$CH_2CH_2CH_2$—,

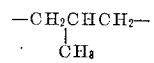

and the like; arylene groups, such as

and the like; cycloalkylene groups, such as cyclopentylene, cyclohexylene and the like; and divalent heterocyclic groups, such as divalent radicals obtained from furfural, thiophene, pyridine and the like.

The aldehyde dioxolone derivatives of lactic acid employed as starting materials in the present process are prepared by the well-known technique of reacting lactic acid with an aldehyde with loss of water. This reaction is conveniently carried out under azeotropic distillation conditions in a solvent medium, such as benzene, toluene and the like. The aldehydes employed in preparing the aldehyde dioxolone derivatives used in the present process are represented by the formulae:

R—CHO and OHC—$R^1$—CHO wherein R and $R^1$ are defined above.

The present novel process is carried out by heating an aldehyde dioxolone derivative of lactic acid to a temperature of from about 25° C. to about 100° C. under hydrogen pressure of from about 50 p.s.i.g. to about 1300 p.s.i.g. in the presence of a hydrogenation catalyst and continuing such heating and pressurization until hydrogen consumption ceases. The preferred reaction temperature is from about 50° C. to about 100° C. The preferred reaction pressure is from about 50 p.s.i.g. to about 400 p.s.i.g. hydrogen. Hydrogenation catalysts, such as nickel, platinum, rhodium, palladium, ruthenium and the like are employed in this process. A preferred catalyst is Raney nickel, type W–2, a highly active catalyst known in the hydrogenation art. It is also preferable to carry out the process in the presence of an inert solvent, such as methanol, ethanol, isopropanol and the like.

At the conclusion of the reaction, the reaction mixture is cooled to about room temperature and is filtered to remove the catalyst. The hydrogenation catalyst, especially when nickel is employed, tends to react with some of the ether derivative of propionic acid produced by the process to form the nickel salt of the acid derivative. The above filtrate is treated with hydrogen sulfide to precipitate the nickel as nickel sulfide which is then removed by filtration. The resulting filtrate is stripped of solvent by distillation and the residual oil is fractionated under reduced pressure to recover the desired ether derivative of propionic acid.

The ether acids produced by the present process are useful as plasticizers in the polymer art for vinyl polymers, polyethylenes and the like. They can be incorporated in polymer compositions by well-known techniques in order to plasticize the compositions.

The invention is further described in the following examples.

EXAMPLE I

A. Preparation of dioxolone

A mixture of 90 g. lactic acid, 72.0 g. n-butyraldehyde and 300 ml. benzene solvent was heated to reflux for 6.5 hours. The water of reaction was collected in a Dean-Stark trap. The solvent benzene was removed from the reaction mixture by distillation under reduced pressure and the residual oil was fractionated to obtain 106 g. (73 percent theoretical yield) of 5-methyl-2-propyl-1,3-dioxolone-4 having the properties of boiling point 85°–86° C./12 mm. Hg; refractive index ($n_D^{25}$) 1.4254; specific rotation ($\alpha_D^{25}$) —21.0°.

B. Preparation of ether acid 5-methyl-2-propyl-1,3-dioxolone-4 (28.8 g.) was dissolved in 100 ml. methanol and 1 g. Raney nickel (W–2 type) catalyst was added to the solution. The preparation of this catalyst is described in "Organic Synthesis," Collective Volume 3, pp. 181–182 (1955), John Wiley. The mixture was hydrogenated at a temperature of 50° C. and an initial pressure of 50 p.s.i.g. hydrogen. Hydrogenation was complete after 3 hours during which time the pressure dropped 13.6 lbs. Completion of hydrogenation was indicated by a constant pressure. The hydrogenation mixture was filtered to remove the nickel catalyst and the green filtrate was treated with hydrogen sulfide to precipitate nickel sulfide, which was removed by suction filtration. The solvent was removed from the resulting filtrate by atmospheric pressure distillation and the residual oil was fractionated to obtain 28.0 g. (97 percent theoretical yield) of α-butoxy-propionic acid having the properties of B.P. 92°–97° C./12 mm.; ($n_D^{25}$) 1.4199; ($\alpha_D^{25}$) +13.4°. The structure of the product was confirmed by infrared spectroscopy analysis. This product is useful as a plasticizer for polymers.

EXAMPLE II

A. Preparation of dioxolone

A mixture of 270 g. lactic acid, 600 g. glutaraldehyde in the form of a 25 weight percent aqueous solution, 600 g. benzene solvent and 5 g. p-toluene sulfonic acid catalyst was heated to reflux. The 450 ml. water in the glutaraldehyde solution was collected in a Dean-Stark trap in two hours. Refluxing was continued for an additional 3.25 hours while the water of reaction was collected. The reaction mixture was then cooled to room temperature, washed with two 300 ml. portions of water to remove the catalyst and unreacted lactic acid, and the solvent was stripped by distillation under reduced pressure. The residual oil was fractionally distilled to obtain 673 g. (91.9 percent theoretical yield) of 2,2'-trimethylene-(5,5'-methyl-1,3,1',3'-dioxolone-4,4') having the properties of B.P. 208°–213° C./12 mm.; ($n_D^{25}$) 1.4588; ($\alpha_D^{25}$) +20.94°.

B. Preparation of ether acid 2,2' - trimethylene - (5,5' - methyl - 1,3,1',3' - dioxolone-4,4') (48.8 g.) was dissolved in 400 ml. methanol and 2 g. Raney nickel (W–2 type) catalyst were added to the solution. This solution was placed in an 800 ml. rocking type hydrogenation apparatus. The mixture was hydrogenated at a temperature of 100° C. and an initial pressure of 1250 p.s.i.g. hydrogen. The hydrogenation was complete after 3 hours, during which time the pressure dropped 325 lbs. Completion of hydrogenation was indicated by a constant pressure. After cooling to room temperature, the contents of the hydrogenation reactor were filtered to remove the nickel catalyst. The resulting green filtrate was saturated with hydrogen sulfide and the insoluble nickel sulfide removed by vacuum filtration. The methanol solvent was removed from the filtrate by distillation and the residual oil was fractionated to obtain 57.6 g. (75 percent theoretical yield of 1,5-pentamethylene-bis (oxy-α-propionic acid) having the properties of B.P. 43°–44° C./12 mm.; ($n_D^{25}$) 1.4236; ($\alpha_D^{25}$) +20.07°. The structure was confirmed by infrared spectroscopy analysis. This product is useful as a polymer plasticizer.

EXAMPLE III

In a manner similar to that described in Example I above, aldehyde dioxolone derivatives of lactic acid were prepared from formaldehyde, benzaldehyde, ethyl vanillin and furfural, resulting in compounds of formula

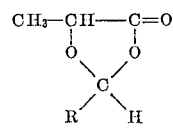

wherein R was H—, $C_6H_5$—,

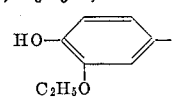

and

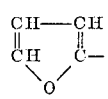

respectively. The corresponding ether derivatives of propionic acid are prepared by hydrogenation of the above dioxolones according to the above described procedure.

In summary, this invention relates to an improved process for the production of ether derivatives of propionic acid which comprises hydrogenation of aldehyde dioxolone derivatives of lactic acid under controlled conditions.

What is claimed is:

1. A process for the preparation of ether derivatives of propionic acid selected from the class consisting of compounds of the formulae:

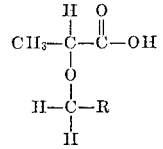

and

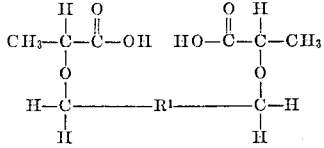

wherein R is selected from the class consisting of the hydrogen atom and monovalent hydrocarbon radicals selected from the class consisting of alkyl, aryl, alkaryl, aralkyl, alicyclic, and furfuryl, thienyl, and pyridyl radicals and substituted radicals thereof wherein the substitutents are selected from the class consisting of halogen, amino, cyano, nitro, hydroxy and alkoxy radicals and $R^1$ is a divalent hydrocarbon radical selected from the class consisting of alkylene, arylene, cycloalkylene radicals and divalent radicals obtained from furfural, thiophene and pyridine, which comprises reacting an aldehyde dioxolone derivative of lactic acid selected from the class consisting of compounds of the formulae:

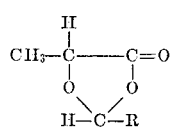

and

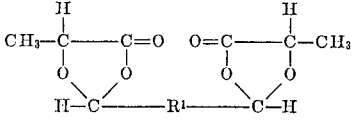

wherein R and R¹ are defined above, with hydrogen in the presence of a hydrogenation catalyst.

2. A process for the preparation of ether derivatives of propionic acid having the formula:

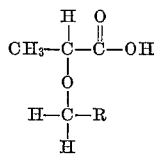

wherein R is selected from the class consisting of the hydrogen atom and monovalent hydrocarbon radicals selected from the class consisting of alkyl, aryl, alkaryl, aralkyl, alicyclic, and furfuryl, thienyl, and pyridyl radicals and substituted radicals thereof wherein the substituents are selected from the class consiting of halogen, amino, cyano, nitro, hydroxy and alkoxy radicals, which comprises reacting an aldehyde dioxolone derivative of lactic acid having the formula:

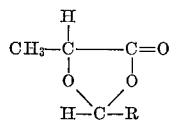

wherein R is defined above, with hydrogen in the presence of a hydrogenation catalyst.

3. A process for the preparation of ether derivatives of propionic acid having the formula:

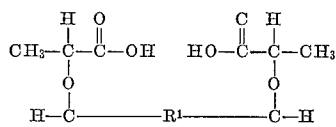

wherein R¹ is a divalent hydrocarbon radical selected from the class consisting of alkylene, arylene, cycloalkylene radicals and divalent radicals obtained from furfural, thiophene and pyridine, which comprises reacting an aldehyde dioxolone derivative of lactic acid having the formula:

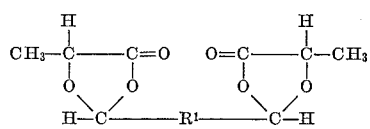

wherein R¹ is defined above, with hydrogen in the presence of a hydrogenation catalyst.

4. A process as claimed in claim 1 wherein the reaction is carried out in the presence of an inert solvent.

5. A process as claimed in claim 2 wherein the reaction is carried out in the presence of an inert solvent.

6. A process as claimed in claim 3 wherein the reaction is carried out in the presence of an inert solvent.

7. A process as claimed in claim 1 which is carried out at a temperature of from about 25° C. to about 100° C. under hydrogen pressure of from about 50 p.s.i.g. to about 1300 p.s.i.g.

8. A process as claimed in claim 2 which is carried out at a temperature of from about 25° C. to about 100° C. under hydrogen pressure of from about 50 p.s.i.g. to about 1300 p.s.i.g.

9. A process as claimed in claim 3 which is carried out at a temperature of from about 25° C. to about 100° C. under hydrogen pressure of from about 50 p.s.i.g. to about 1300 p.s.i.g.

10. A process as claimed in claim 1 which is carried out at a temperature of from about 50° C. to about 100° C. under hydrogen pressure of from about 50 p.s.i.g. to about 400 p.s.i.g.

11. A process as claimed in claim 2 which is carried out at a temperature of from about 50° C. to about 100° C. under hydrogen pressure of from about 50 p.s.i.g. to about 400 p.s.i.g.

12. A process as claimed in claim 3 which is carried out at a temperature of from about 50° C. to about 100° C. under hydrogen pressure of from about 50 p.s.i.g. to about 400 p.s.i.g.

13. A process for the preparation of α-butoxy propionic acid which comprises reacting hydrogen, in the presence of a hydrogenation catalyst, with 5-methyl-2-propyl-1,3-dioxolone-4 at a temperature of from about 50° C. to about 100° C. under hydrogen pressure of from about 50 p.s.i.g. to about 400 p.s.i.g. and in the presence of an inert solvent.

14. A process for the preparation of 1,5-pentamethylene-bis(oxy-α-propionic acid) which comprises reacting hydrogen, in the presence of a hydrogenation catalyst, with 2,2'-trimethylene-(5,5'-methyl-1,3,1',3'-dioxolone - 4, 4') at a temperature of from about 50° C. to about 100° C. under hydrogen pressure of from about 50 p.s.i.g. to about 400 p.s.i.g. and in the presence of an inert solvent.

References Cited by the Examiner

Fuson; J.A.C.S., vol. 64, pp. 1567–71 (1942).

LORRAINE A. WEINBERGER, *Primary Examiner.*

LEON ZITVER, *Examiner.*

D. P. CLARKE, A. P. HALLUIN, *Assistant Examiners.*